(12) United States Patent
Berzanskis et al.

(10) Patent No.: US 7,620,182 B2
(45) Date of Patent: Nov. 17, 2009

(54) QKD WITH CLASSICAL BIT ENCRYPTION

(75) Inventors: Audrius Berzanskis, Cambridge, MA (US); Jonathan Young, Newburyport, MA (US)

(73) Assignee: MagiQ Technologies, Inc., New York, NY (US)

( * ) Notice: Subject to any disclaimer, the term of this patent is extended or adjusted under 35 U.S.C. 154(b) by 39 days.

(21) Appl. No.: 10/577,625

(22) PCT Filed: Feb. 13, 2004

(86) PCT No.: PCT/US2004/004450

§ 371 (c)(1),
(2), (4) Date: Apr. 28, 2006

(87) PCT Pub. No.: WO2005/057927

PCT Pub. Date: Jun. 23, 2005

(65) Prior Publication Data

US 2007/0140495 A1    Jun. 21, 2007

Related U.S. Application Data

(60) Provisional application No. 60/519,489, filed on Nov. 13, 2003.

(51) Int. Cl.
*H04K 1/00* (2006.01)
*H04L 9/00* (2006.01)
(52) U.S. Cl. .......................... 380/256; 380/277; 380/44
(58) Field of Classification Search .................. 380/256
See application file for complete search history.

(56) References Cited

U.S. PATENT DOCUMENTS

| | | | | |
|---|---|---|---|---|
| 5,675,648 A | * | 10/1997 | Townsend | 380/278 |
| 5,757,912 A | * | 5/1998 | Blow | 380/256 |
| 5,764,765 A | * | 6/1998 | Phoenix et al. | 380/283 |
| 5,850,441 A | * | 12/1998 | Townsend et al. | 380/283 |
| 6,529,601 B1 | * | 3/2003 | Townsend | 380/256 |
| 7,035,411 B2 | * | 4/2006 | Azuma et al. | 380/256 |
| 7,298,848 B2 | * | 11/2007 | Debuisschert | 380/256 |
| 7,430,295 B1 | * | 9/2008 | Pearson et al. | 380/256 |
| 7,512,242 B2 | * | 3/2009 | Pearson et al. | 380/281 |
| 7,536,012 B1 | * | 5/2009 | Meyers et al. | 380/44 |
| 2002/0106084 A1 | * | 8/2002 | Azuma et al. | 380/263 |
| 2003/0112970 A1 | * | 6/2003 | Mitra | 380/44 |
| 2004/0032954 A1 | * | 2/2004 | Bonfrate et al. | 380/263 |
| 2006/0120529 A1 | * | 6/2006 | Gisin et al. | 380/256 |

OTHER PUBLICATIONS

C.H. Bennett e tal. "Quantum Cryptography: Public key distribution and coin tossing." Proceedings of IEEE International Conference on Computers, Systems, and Signal Processing. Bangalore India. p. 175-179.*

(Continued)

*Primary Examiner*—Christian LaForgia
(74) *Attorney, Agent, or Firm*—Opticus IP Law PLLC

(57) ABSTRACT

A method for enhancing the security of a quantum key distribution (QKD) system having QKD stations Alice and Bob. The method includes encrypting key bits generated by a true random number generator (TRNG) and sent to a polarization or phase modulator to encode weak optical pulses as qubits to be shared between Alice and Bob. Key bit encryption is achieved by using a shared password and a stream cipher. Bob obtains at least a subset of the original key bits used by Alice by utilizing the same stream cipher and the shared password.

7 Claims, 4 Drawing Sheets

ALICE

For i = 1 to n:

OTHER PUBLICATIONS

Bruce Schneier. Applied Cryptograph. 1996. John Wiley & Sons, Inc. p. 197-211.*

Gisin et al, "Quantum Cryptography", Rev.Mod.Phys., vol. 74, Jan. 2002.

Biham et al, "A Proof of the Security of Quantum Key Distribution", Proceedings of 32nd Annual ACM Symposium on Theory of Computing, May 21-23, 2000, Portland, OR, USA.

Zhang et al, "Cryptographically Resilient Functions", IEEE Transactions on Information Theory, vol. 43, No. 5, pp. 1740-1747, Sep. 1997.

Bennett, "Experimental Quantum Cryprography", Advances in Cryprography-EUROCRYPT'90, LNCS, vol. 473, pp. 253-265, 1991.

Bouwmeester, "The physics of quantum information," Springer-Verlag, Berlin, Germany 2001, (ISBN 3-540-66778-4) pp. 27-33.

* cited by examiner

QKD WITH CLASSICAL BIT ENCRYPTION

CLAIM OF PRIORITY

This patent application claims priority from U.S. Provisional Patent Application No. 60/519,489, filed on Nov. 13, 2003.

TECHNICAL FIELD OF THE INVENTION

The present invention relates to quantum cryptography, and in particular relates to and has industrial utility for systems and methods for enhancing the security of a quantum key distribution (QKD) system by adding classical encryption to the quantum key distribution process.

BACKGROUND ART

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in publications by C. H. Bennett et al entitled "Experimental Quantum Cryptography" *J. Cryptology* 5: 3-28 (1992), and by C. H. Bennett entitled "Quantum Cryptography Using Any Two Non-Orthogonal States", Phys. Rev. Lett. 68 3121 (1992).

The above-mentioned publications each describe a so-called "one-way" QKD system wherein Alice randomly encodes the polarization or phase of single photons, and Bob randomly measures the polarization or phase of the photons. The one-way system described in the Bennett 1992 paper is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a few tens of nanoseconds during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

The general process for performing QKD is described in the book by Bouwmeester et al., "The Physics of Quantum Information," Springer-Verlag 2001, in Section 2.3, pages 27-33. As described therein, during the QKD process, Alice uses a true random number generator (TRNG) to generate a random bit for the basis ("basis bit") and a random bit for the key ("key bit") to create a qubit (e.g., using polarization or phase encoding) and sends this qubit to Bob. The collection of exchanged qubits is called the "raw key." Alice and Bob then use a public channel compare the bases used to measure the qubits and keep only those bits having the same basis. This collection of bits is called the "sifted key."

While QKD is theoretically secure, the practical implementation of QKD allows for several ways for an eavesdropper to get information about the key bits. For example, to encode the value of a key bit on a photon one needs fast electronics, which produce electromagnetic radiation. This radiation can be measured by an eavesdropper in a so-called "side channel attack." For phase-encoded QKD, this may be a serious problem, since phase modulators can actually produce enough measurable electromagnetic (EM) radiation. Second, an eavesdropper might get partial information on the key by monitoring transmission in the fiber. This is possible when multi-photon pulses are produced by a weak coherent source. An eavesdropper can measure such pulses without introducing errors in the transmission. Third, an eavesdropper may be able to launch a so called "Trojan horse attack" on Alice with a well-timed probing pulse in order to obtain information about the state of the phase modulator.

SUMMARY OF THE INVENTION

As described in greater detail below, a first aspect of the invention is a method of performing quantum key distribution (QKD). The method includes generating a random set of key bits, encrypting the key bits, and then using the encrypted key bits to form encrypted qubits.

A second aspect of the invention is a method of performing QKD. The method includes, at a first station: generating a random set of key bits, generating a pad (password) by a stream cipher (e.g., AES-256 in CTR mode), XOR-ing the key bits and the pad to obtain encrypted key bits, and then modulating weak optical pulses using the encrypted key bits to generate encrypted qubits.

A third aspect of the invention is related to the second aspect of the invention, and further includes performing the following acts at a second QKD station optically coupled to the first QKD station: measuring the encrypted qubits using a random basis, and recovering at least a subset of the key bits from the measured encrypted qubits by XOR-ing the measured encrypted qubits with the pad. These and other aspects of the invention are described below.

DETAILED DESCRIPTION OF THE INVENTION

Figure 1:
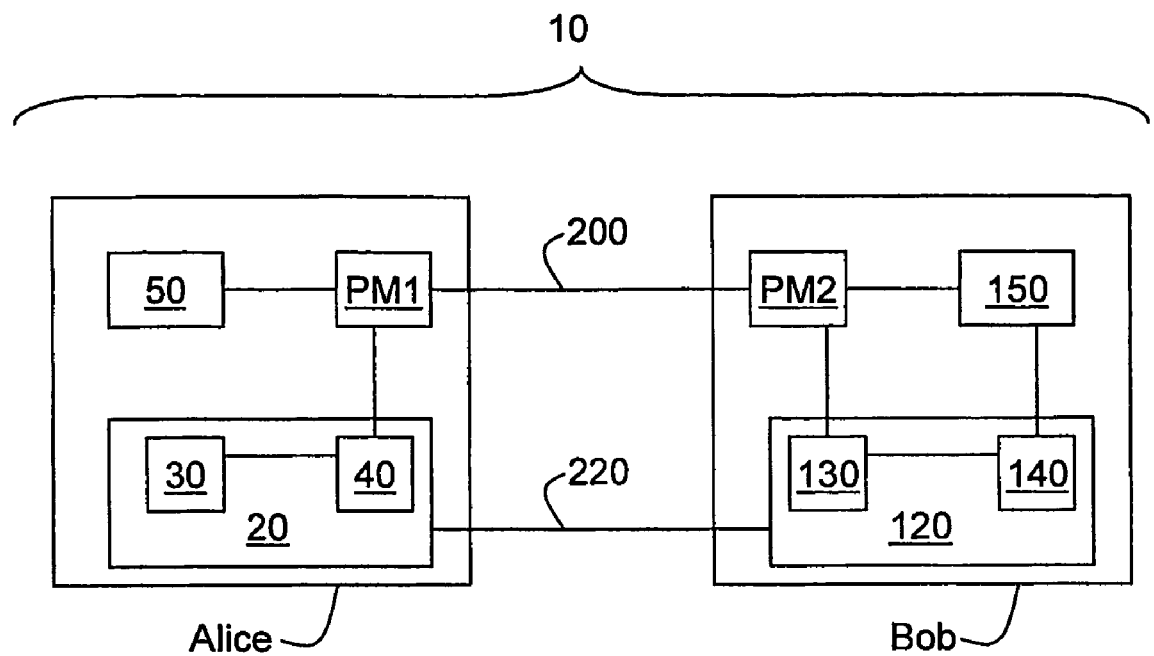
FIG. 1 is a schematic diagram of a one-way QKD system having a sending station Alice and a receiving station Bob each with a controller having a TRNG and an encryption/decryption (e/d) module for carrying out the method of the present invention.

FIG. 1 is a schematic diagram of a one-way QKD system 10 having a sending station Alice and a receiving station Bob. Alice and Bob are more generally sometimes referred to as QKD stations. Alice includes a controller 20 having a TRNG 30 and an encryption/decryption (e/d) module 40 connected thereto. Alice also includes an optical radiation source 50 (e.g., a laser) and a polarization or phase modulator PM1 arranged downstream of the optical radiation source and optically coupled thereto. PM1 is operably coupled to e/d module 40, and laser 50 is operably coupled to the controller 20. In an example embodiment, optical radiation source 50 includes an attenuator (not shown) for reducing the intensity of optical pulses so that they are "weak," i.e., having single-photon level and below. In an example embodiment, optical radiation source is a single-photon source.

Bob includes a controller 120 having a TRNG 130 and an e/d module 140. In an example embodiment, TRNG 130 and e/d module 140 are coupled so that random numbers generated by TRNG 130 and used as basis bits for Bob can also be stored in e/d module 140.

Bob also includes a single-photon detector 150 and a polarization or phase modulator PM2 arranged upstream of the detector and optically coupled thereto. PM2 is operably coupled to TRNG 130, and detector 150 is operably coupled to e/d module 140.

Bob and Alice are operably coupled by a quantum communication link (channel) 200, which in an example embodiment is an optical fiber. Also in an example embodiment, Alice's controller 20 and Bob's controller 120 are operably connected via a public communication link (channel) 220 for timing and synchronizing the operation of system 10, and for otherwise publicly communicating information between Bob and Alice. For example, encrypted basis bits can be sent from Alice to Bob via channel 220. In an example embodiment, e/d module 40 and/or 140 includes a computer-readable medium in which is embodied encryption software that includes executable instructions for controllers 20 and 120 to carry out the methods of the present invention as described below.

With continuing reference to FIG. 1, in the normal operation of a QKD system such as QKD system 10, qubits are exchanged between Alice and Bob by controller 20 causing optical radiation source 50 to emit weak (e.g., ~0.1 photon) optical pulses. Controller 20 then provides basis and key bits via TRNG 30 (or alternatively via two separate TRNG's 30) to PM1 to randomly encode the weak pulses. At Bob, controller 120 also causes PM2 to randomly select (via TRNG 120) a basis to measure and detect the modulated qubits at detector 150.

However, as discussed above, there are potential security shortcomings in this QKD process. To address these shortcomings, the present invention further involves encrypting (e.g., at the software level) using e/d module 40 at least the key bits from TRNG 30 used to set Alice's phase modulator state for each qubit. This results in "encrypted qubits" being sent to Bob.

The invention further includes recovering a corresponding set of key bits from the encrypted qubits received by Bob using e/d module 140. As discussed below, the "corresponding set" of key bits is typically a subset of the original set of key bits due to the loss of encrypted qubits as they pass over quantum channel 200.

Figure 2:
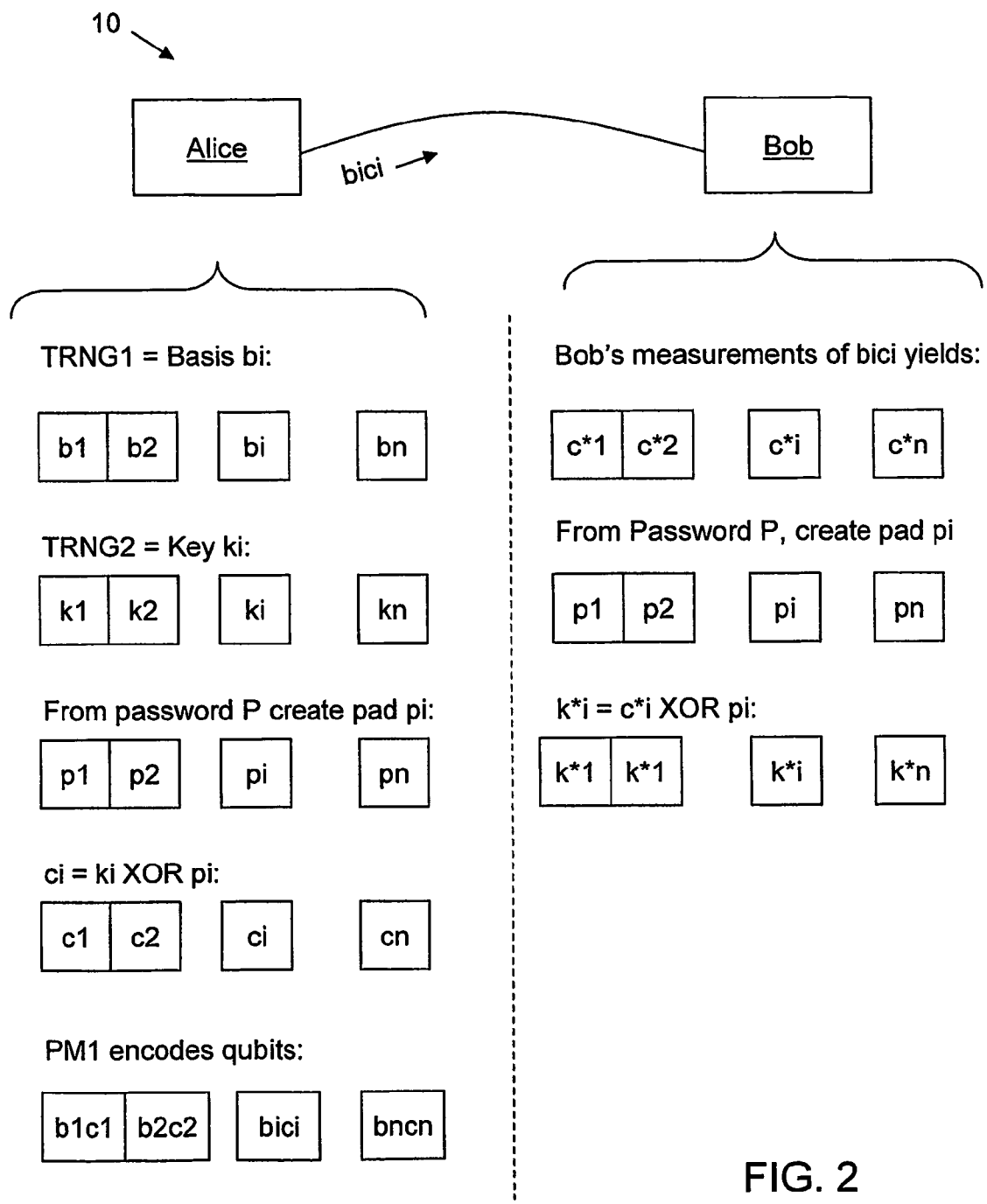
FIG. 2 is a schematic diagram illustrating the encryption of the key bits used to set Alice's phase modulator state in generating each qubit.
Figure 3:
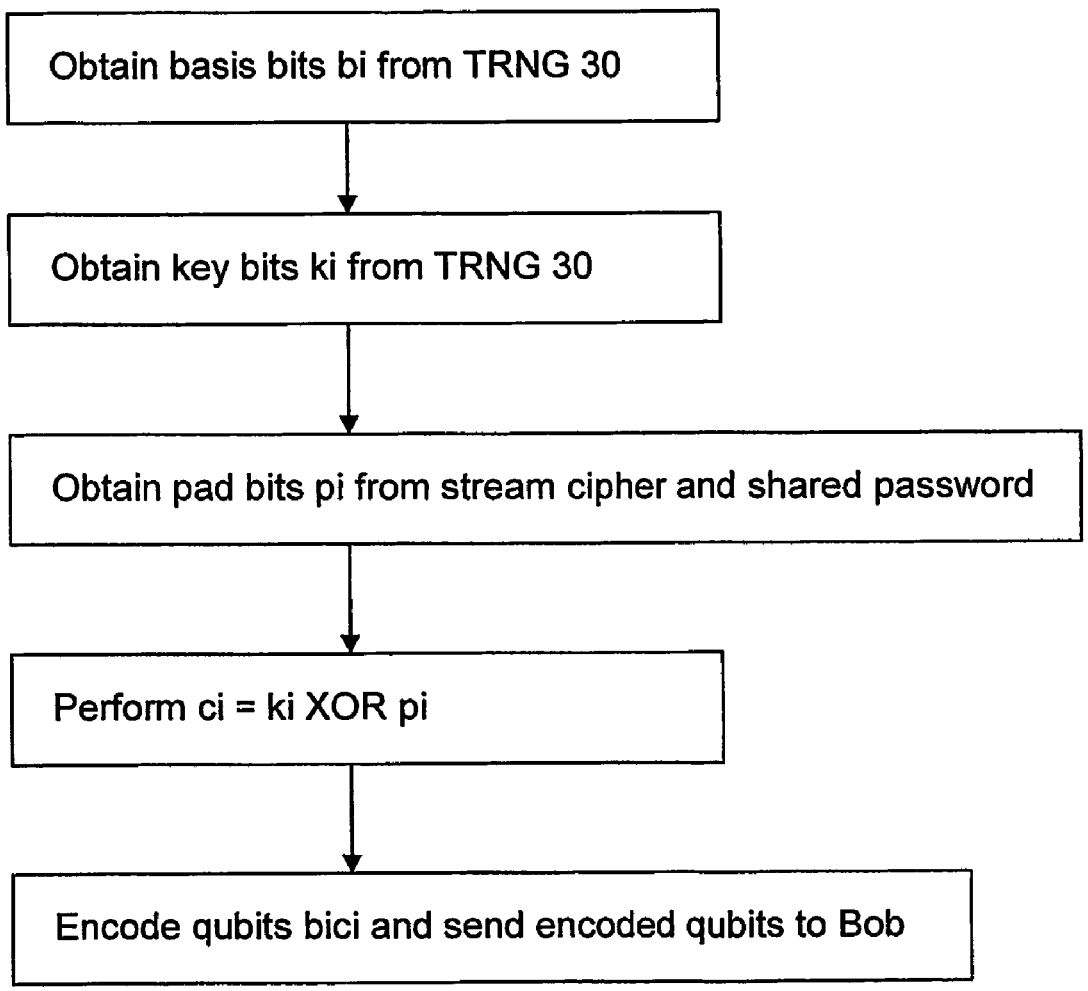
FIG. 3 is a flow diagram illustrating how Alice encrypts key bits produced by a random number generator by using a stream-cipher.

The method of encrypting Alice's key bits is illustrated in FIGS. 2 and 3. Suppose TRNG 30 generate basis bits $b_1, b_2, \ldots b_i, \ldots b_n$ and key bits $k_1, k_2, \ldots k_i, \ldots k_n$ used bits to form a set of qubits. In an example embodiment, two TRNGs 30 are used to separately generate the basis and key bits, respectively.

In an example embodiment of the invention, key-bit values $k_i$ are encrypted by e/d module 30 with a stream cipher (e.g., AES in CTR mode). To do this, Bob and Alice must share a pre-agreed password. The stream cipher is needed because some qubits can be lost in quantum channel 200. The loss of qubits during transmission precludes the use of other types of ciphers.

Suppose Alice and Bob share a password P. In an example embodiment, password P is created by either using a fraction of their key generated by QKD. In another example embodiment, password P is created using one of the known methods, such as secure currier or Diffie-Hellman protocol. In an example embodiment, Alice and Bob agree to refresh the password P at a chosen rate. Having this password, they can generate a pad $p_1, p_2, \ldots p_i, \ldots p_n$ by means of a stream cipher Once the pad is generated, Alice then performs in e/d module 30 the "exclusive OR" (XOR) operation:

$$k_i \text{ XOR } p_i = c_i$$

Alice also sets her phase modulator PM1 to encode $c_i$ on a qubit, not $k_i$. This process is illustrated in the flow diagram of FIG. 3. The result is what is referred to herein as an "encrypted qubit" or an "encoded qubit."

When Bob performs his measurement of the encoded qubit with randomly modulated PM2 and detector 150, he gets the value of $c^*_i$, which typically is a subset of $c_i$, since some qubits are usually lost during transmission due to losses in the quantum channel 200. In an example embodiment, the $c^*_i$ are stored in e/d module 140.

Figure 4:
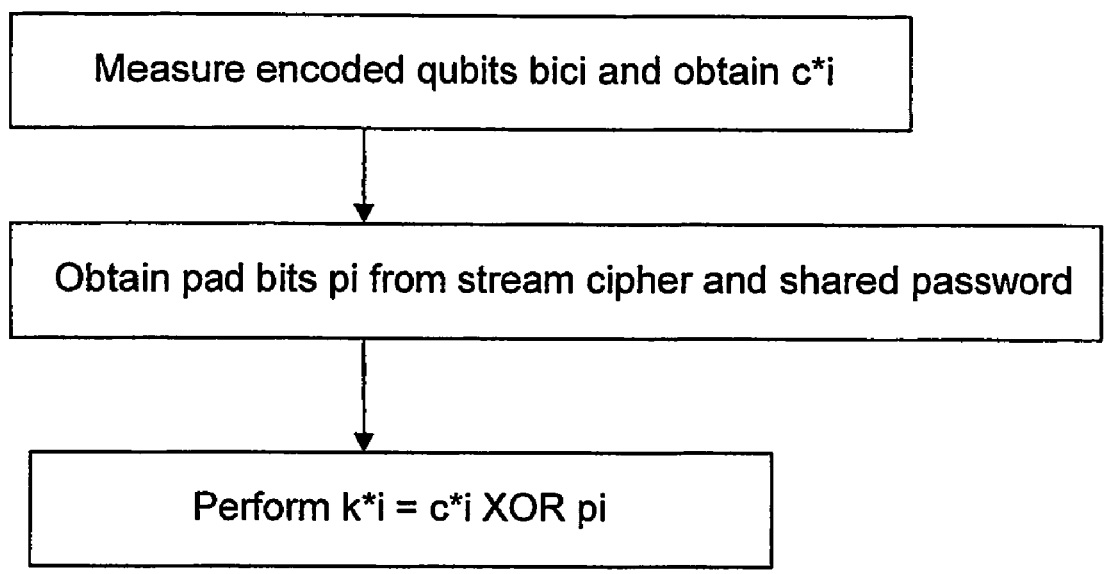
FIG. 4 is a flow diagram illustrating how Bob recovers the key bits from the encrypted qubits using the same stream cipher as Alice in combination with the shared password.

As illustrated in the flow diagram of FIG. 4, to recover corresponding key bits $k^*_i$ from the encrypted qubits, Bob needs to XOR these bits in e/d module 130 with the pad $p_i$ as follows:

$$k^*_i = c^*_i \text{ XOR } p_i.$$

The key bit set $k^*_i$ is typically a subset of the original key bit set because of the loss of encrypted qubits as they travel over quantum channel 200.

At this point, Bob and Alice run standard QKD procedures (e.g., sifting, error correction, privacy amplification). It is preferable that all information sent during the latter procedures is encrypted with a cipher of the cryptographic strength not lower than the stream cipher. Some information has to be authenticated, as required in the BB84 protocol.

Alternatively, Alice and Bob can run sifting and/or error correction first and decrypt the bits afterwards. This would require some simple modifications of the decryption process.

Any information an eavesdropper can obtain by launching a side channel or any optical attack on QKD system 10 operated in the manner described above can only yield information about encrypted key bits $c_i$ rather than the actual key bits $k_i$.

In an example embodiment of the invention, the basis bits are encrypted in addition to the key bits to provide an additional level of security. In an example embodiment, this is done by encrypting the basis bits and sending them over the standard communication channel 220. However, encrypting the key bits alone provides a high degree increase security over the prior art QKD process.

Implementing the method of the present invention prevents an eavesdropper from getting access to the plaintext key even in the case of fatal failure of QKD device. In case of a fatal failure of the QKD system, the maximum amount of information an eavesdropper can obtain is the classically encrypted key.

The present invention was described above in connection a one-way QKD system for the sake of illustration. It will be apparent to those skilled in the art that the present invention also applies generally to quantum cryptography, and in particular to a two-way QKD system, and to any QKD system that encodes the phase or polarization of weak pulses using a modulator-type element.

The present invention also provides a way for a quantum-based cryptography system to satisfy information processing standards, such as the Federal Information Processing Standards (FIPS) for the United States, that exist for classical encryption systems. Presently, satisfying the relevant information processing standards for a given country is problematic for those seeking to commercialize quantum cryptography systems because such standards do not presently exist.

Though information processing standards are ostensibly for the procurement of equipment by governments, the practical effect is that private industry also looks to such standards when purchasing equipment. This is particularly true in the United States, for example, because certain government institutions (e.g. the National Institute for Standards and Technology, or "NIST") collaborate with national and international standards committees, users, industry groups, consortia and research and trade organizations to develop the standards. Thus, it is to a company's business advantage that their equipment satisfies the particular information processing standards even if it has no intention of selling equipment to the government in question.

By layering a classical encryption system that is compliant with local information processing standards with quantum encryption according to the present invention, the system as a whole can comply with the classical encryption information processing standards.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of establishing an initial quantum key using quantum key distribution (QKD) with weak optical pulses, comprising:
   a) at a first QKD station initially having no shared quantum key with a second QKD station:
      generating a random set of initial key bits $k_1, k_2, \ldots k_i \ldots k_n$;
      encrypting the initial key bits;
      using the encrypted initial key bits to form encrypted qubits from the optical pulses without first forming unencrypted qubits from the optical pulses;
   b) at the second QKD station:
      receiving and measuring the encrypted qubits;
      decrypting the measured encrypted qubits so as to recover a corresponding set of the key bits; and
      processing the initial and recovered sets of key bits to establish the initial quantum key at the first and second QKD stations.

2. The method of claim 1, including:
   encrypting the key bits using a stream cipher.

3. The method of claim 2, wherein the stream cipher uses a password formed from a fraction of a QKD key.

4. The method of claim 2, including decoding the encrypted qubits using the stream cipher.

5. A method of establishing an initial quantum key using quantum key distribution (QKD) using weak optical pulses, comprising:
   at a first QKD station initially having no shared quantum key with a second QKD station:
      generating a random set of key bits;
      generating a pad using a stream cipher;
      XOR-ing the key bits and the pad to obtain encrypted key bits:
      modulating the weak optical pulses using the encrypted key bits so as to simultaneously encode and encrypt the optical pulses to form encrypted qubits;
   at the second QKD station optically coupled to the first QKD station:
      receiving and measuring the encrypted qubits using a random basis;
      recovering at least a subset of the key bits from the measured encrypted qubits by XOR-ing the measured encrypted qubits with the pad; and
      processing the recovered subset of key bits to establish the initial quantum key at the first and second QKD stations.

6. The method of claim 5, further including:
   establishing a sifted key between the first and second QKD stations based on the key bits generated in the first QKD station and the key bits recovered in the second QKD station.

7. A QKD system, comprising:
   a) a first QKD station initially having no shared quantum key and having:
      a. an optical radiation source adapted to emit weak optical pulses of radiation;
      b. a first random number generator adapted to generate random numbers for use as first key bits;
      c. a first e/d module coupled to the first random number generator to encrypt the key bits thereby forming encrypted key bits;
      d. a modulator arranged to receive the weak optical pulses and adapted to modulate the polarization or phase of the weak optical pulses based on the encrypted key bits to form encrypted qubits without first forming unencrypted qubits;
      e. a first controller configured to control the operation of the first QKD station;
   b) a second QKD station initially having no shared quantum key and optically coupled to the first QKD station and having:
      a. a second modulator adapted to receive and randomly polarization-modulate or phase-modulate the encrypted qubits;
      b. a detector for detecting the modulated encrypted qubits;
      c. a second e/d module coupled to the detector and adapted to recover from the modulated encrypted qubits second key bits corresponding to the first key bits; and
      d. a second controller operably coupled to the first controller, wherein the first and second controllers are configured to run QKD procedures to establish an initial quantum key between the first and second QKD stations from the first key bits and the recovered second key bits.

* * * * *